United States Patent [19]

Kime

[11] 4,327,115
[45] Apr. 27, 1982

[54] CLARIFICATION OF FRUIT JUICE WITH HONEY

[75] Inventor: Robert W. Kime, Romulus, N.Y.

[73] Assignee: Cornell Research Foundation, Inc., Ithaca, N.Y.

[21] Appl. No.: 160,263

[22] Filed: Jun. 17, 1980

[51] Int. Cl.³ .............................. A23L 2/30; A23L 2/34
[52] U.S. Cl. ........................................ 426/12; 426/15; 426/51; 426/52; 426/422; 426/495; 426/577; 426/592; 426/599; 426/654; 426/658
[58] Field of Search ................. 426/12, 15, 51, 52, 426/573, 577, 592, 599, 654, 658, 422, 490, 495; 210/727, 728, 730, 738, 713

[56] References Cited

U.S. PATENT DOCUMENTS

| | | | |
|---|---|---|---|
| 358,320 | 2/1881 | Algoever | 426/422 |
| 1,842,673 | 5/1929 | Joseph | 426/658 X |
| 2,690,972 | 10/1954 | Bradshaw | 426/658 |
| 3,041,175 | 6/1962 | Atkinson et al. | 426/15 X |
| 3,236,655 | 2/1966 | Murch et al. | 426/422 X |
| 3,347,678 | 10/1967 | Villadsen et al. | 426/51 X |
| 3,917,867 | 11/1975 | Atkins et al. | 426/599 X |
| 4,089,985 | 5/1978 | Wolff | 426/599 X |

FOREIGN PATENT DOCUMENTS

| | | | |
|---|---|---|---|
| 979829 | 12/1975 | Canada | 426/592 |
| 52-3864 | 1/1977 | Japan | 426/599 |

OTHER PUBLICATIONS

Amerine, *The Technology of Wine Making*, 1972, pp. 400, 445 & 498.

*Primary Examiner*—Arthur L. Corbin
*Attorney, Agent, or Firm*—Jones, Tullar & Cooper

[57] ABSTRACT

The present invention relates to a method for the clarification and removal of hazes from fresh, pasteurized, and fermented fruit juices by the use of honey as a clarifying agent, or alternatively, the treatment of the unclarified juice with both tannin and honey in instances where the natural fruit juice tannins are low. Furthermore, these clarification processes can be used in conjunction with presently used clarification processes, such as enzyme treatment, to shorten the clarification period.

33 Claims, No Drawings

CLARIFICATION OF FRUIT JUICE WITH HONEY

The juice industry has used many methods of clarification for fresh and fermented juices. These methods include the enzyme clarification method such as with Klerzyme as well as treatments with bentonite, gelatin, or Sparkolloid. However, all of these methods have resulted in producing a juice product containing unwanted characteristics such as permanent hazes, off flavors, loss of flavor, and pectin removal with loss of body. Hence, a product is produced for the consumer with a quality much less than that of its original state. In order to combat these unfavorable effects, juice processors are often forced to add sweeteners to the juice to produce a product with an acceptable taste. Sugar additives such as refined sucrose, fructose, and beet sugar are often viewed upon with disfavor by the consumer searching for more natural products for consumption.

The clarification process of the present invention using honey as the clarification agent not only increases the fruit juice flavor by adding additional sweetness, but avoids formation of off flavors and permanent hazes and a subsequential loss of body. These factors fulfill a long awaited need in the juice processing industry.

Furthermore, through the use of the process of the present invention, pectin, a desirable component which is present in many unclarified juices and is removed by most prior art clarification treatments, remains in the juice after clarification with honey. Pectins are thought to be a very important dietary component by promotion of intestinal stasis, a detoxicant of heavy metals and reducer of blood and tissue cholesterol levels. Also, presently in fruit jelly production, natural pectin is removed during enzyme clarification and necessarily must be added to the juice in order to form a jell. Thus, the present clarification process is applicable to the fruit jelly production industry.

Still a further advantage of the clarification process of the instant invention is one of energy conservation as the present clarification process proceeds at any temperature, even at 32° F, thus eliminating a heating-cooling cycle which is mandatory in prior art clarification methods.

Furthermore, the present clarification process can be used to clarify juices which are inherently low in tannin as tannin or a form of tannins added to the juice which is also treated with honey to clarify the juice.

Still another advantage of the present invention is that the honey or the honey-tannin treatment process can be used in conjuction with other clarification processes such as an enzyme clarification process to drastically reduce the amount of time needed for clarification and to lower the temperature for performance of the clarification.

DESCRIPTION OF THE INVENTION

The present invention relates to a method for the clarification and removal of hazes from fresh, pasteurized, and fermented fruit juices by the use of honey as a clarifying agent, or alternatively, the addition of both tannin or a tannin derivative and honey in instances where the natural fruit juice tannins are low.

According to the present invention, fresh, pasteurized, and fermented fruit juices are clarified by the addition of or treatment with honey. Fresh or pasteurized juices which can be clarified include, among others, apple juice, grape juice, pear juice, prune juice, and the like, and cranberry juice as well as other berry juices. Fermented fruit juices which can be clarified include those of the fresh juices listed above including both hard and sweet apple cider, apple and grape wines, and red and white wines among others. Hereinafter, the term juice as used in the specification and claims will include within its meaning, fresh, pasteurized, and fermented juices, as well as fruit juices which as part of the process steps in the production of the fruit jellies.

The term honey as used herein refers to all commerically available honeys, such as, but not limited to, sunflower honey, buckwheat honey, and clover honey, as well as blends of these honeys.

In carrying out the clarification process of the present invention, honey is added to the juice to be clarified in an amount sufficient to accomplish the desired clarification. This amount is at least one-half weight percent of honey per total weight of the juice to be clarified. While any amount of honey greater than one-half weight percent of the juice can be used to perform the clarification process of the present invention, due to commerical expense, no more than fifteen weight percent of honey would be commercially feasible. Preferably, the amount of honey employed in the present invention is from one to ten weight percent, most preferably from two to five weight percent of the weight of the juice to be clarified. It should be noted that if more honey is used to clarify juice than is actually necessary, the honey adds additional sweetness but does not leave a haze in the final clarified juice product, such as would be found when using other clarifying agents in excess such as bentonite, Sparkolloid, or gelatin.

The honey and juice mixture is then agitated in a sufficient manner to promote effective mixing. The mixture is then allowed to remain at rest while precipitates are formed and settle on the bottom of the holding container.

After the juice has a clarified appearance, the precipitate is removed from the juice. Centrifugal separation as well as filtration techniques can be employed to effect separation of the precipitate from the clarified juice.

The present clarification process can be performed in a temperature range of from anywhere between a temperature which is slightly higher than the freezing temperature of the juice and a temperature which is slightly less than the boiling point of the juice. The preferred temperature range for the performance of the present clarification process is from 40° F. to 140° F., most preferrably from 70° F. to 95° F., as clarification proceeds faster at these higher temperatures.

The present clarification process requires a total treatment time of from one-half hour to twenty hours for mixing, precipitation, and separation. This large variance of time is largely dependent upon the initial clarity of the juice and the percentage of honey used to perform the clarification, as generally, the higher the percentage of honey which is used, the less time is needed to effectuate clarification.

The liquid product which is produced from the present clarification process is clarified to a sparkling state. A juice, such as apple juice, after treatment with the present clarification process is slightly reduced in tannin or its compounds while it retains all or a large part of its pectin content. It is well known in the art that other commercially used clarification processes such as those employing clarifying enzymes eliminate the pectin content of apple juice upon clarification.

Many unclarified juices have low tannin contents. Although tannin is not a necessary component in all of the juices which are clarified by the present clarification process, a small amount of tannin or a form of tannin such as tannic acid is preferably added to the juice which are low in tannin content before, during, or after the addition of honey. The tannin is preferrably added to the juice prior to contact with honey. While any effective amount of tannin or its derivatives can be employed, generally between one to fifty percent by weight of a one percent tannic acid solution is employed per weight of the juice to be clarified. Thus, while an effective amount of a tannin derivative such as tannic acid can be employed, it is preferable to use 0.01 to 0.5 weight percent of tannin, most preferrably between 0.01 to 0.1 weight percent per weight of the juice. The term tannin as used herein and in the claims refers to tannin and all derivatives of tannin such as tannic acid which are effective in the present clarification process.

It is important to determine the minimal effective amount of tannin or its derivatives which can be employed to produce a honey clarifiable juice, in instances where juices are naturally low in tannin. If too much tannin is used, a haze can form in the final clarified product. Therefore, if tannin must be necessarily added, test samples of the unclarified juice having various levels of tannin should be prepared and clarified with honey to determine the minimal effective amount of tannin which should be used in the present clarification process.

It is considered to be within the scope of the present invention that the clarified juice supernatant and the precipitated product which are separated from the clarified juice after clarification contain an amount of honey which, in many instances, is sufficient to be used as a clarifying agent for unclarified juices. While the clarified juice can be employed to clarify unclarified juices, it is preferred to use the recovered precipitate. Thus, honey can be recycled, that is, it can be recovered from the precipitate or the precipitate itself can be used to clarify unclarified juices. Of course, in instances when juices which are naturally low in tannin are to be clarified by the recycled honey, tannin or its derivatives should be added to the unclarified juice prior to the treatment with the recycled honey precipitate.

A further embodiment of the present invention uses honey, in amounts previously specified, in combination with other known clarification agents. For example, honey is added to unclarified juice in combination with an effective amount of a clarifying enzyme, such as Klerzyme. An effective amount of Klerzyme is well known to those skilled in the art. For the purposes of the present invention an effective amount of a clarifying enzyme is 0.002 weight percent or more per weight of the juice to be clarified. The mixture is agitated and allowed to settle. The use of honey in combination with a clarifying enzyme, such as Klerzyme, reduces the needed clarification period from a period of 6 to 18 hours when Klerzyme is used alone, to a needed clarification period of only approximately 30 minutes when effective amounts of honey and Klerzyme are used in combination. Furthermore, when the clarifying enzyme is used alone, clarification necessarily proceeds at approximately 120° F., while, when honey is used in combination with a clarifying enzyme the clarification proceeds smoothly at 60° F.

As in instances where juices are naturally low in tannin, as have been previously discussed, tannin or a derivative of tannin is added to the unclarified juice before, during, or after the period that the juice is conjointly being clarified with honey and a clarifying enzyme.

It is a further embodiment of the present invention that the use of honey as a clarifying agent for unclarified fresh and fermented juices or the use of tannin and honey, can be employed in combination with or following treatment by any of the clarification processes presently known in the art.

It is a further embodiment of the present invention that the present clarification processes are applicable to the clarification of fruit juices as they are being treated in the production of fruit jellies. The advantages of the use of the present clarification processes in the production of fruit jellies are that pectin is not removed during clarification and that the honey which is retained in the juice after clarification sweetens the jelly thus reducing the amount of any additional sweetener which must be added.

It is a further embodiment of the present invention that the components used in the present clarification process can be added to the fruits at various times of processing. For example, whole apples can be contacted with honey before they are crushed, comminuted and strained into juice. This juice produced in this manner undergoes clarification if a sufficient amount of honey exists in the juice. Thus, it is contemplated that the scope of the claims of the present invention encompasses the use of the clarification agents at any step of fruit juice production.

The following examples are submitted for the purpose of further illustrating the nature of the present invention and are not intended as a limitation of the scope thereof. Parts and percentages referred to in the examples and in the specification are by weight unless otherise indicated.

In all of the following examples, when honey and a tannic acid solution are both added to a juice sample, the addition is done sequentially, first the tannic acid solution, followed by the addition of honey. Tannins can be added after the addition of honey if necessary. However, tannin first is recommended since it hastens clarification and allows for proper dissolving of the tannin compounds before the honey addition.

In all of the following examples, the respective juices and clarifying agents were agitated after mixture.

EXAMPLE I

Thirteen 25 ml. samples of freshly pressed apple juice treated with one of a variety of different honeys in a range of 1 to 3 weight percent of honey to the total weight of apple juice at a temperature of 75° F. The different honeys used were sunflower honey, buckwheat honey, clover honey, and a honey blend. Honey was added to the apple juice and agitated. Observations of clarification were recorded after one, two, five and one-half, and 21 hours. A comparative example using 0.02% of Klerzyme was also employed. The results appear in Table I. (In Table I the following abbreviations are employed: N is none, S is slight, M is moderate, SM is slight to moderate, V is very, H is heavy.)

As is demonstrated from the results listed in Table I, the use of the various honeys in varying weight percentages ranging from 1 to 3 percent, as well as the blend of honeys, reduced haze and produced clarification of the apple juice as demonstrated by the amount of precipitation and the sparkle observations. All clarified samples were tasted and were found to have a good to excellent taste with a slight sweetness.

Also shown in Table I is an example of the clarification of apple juice with a boiled blend of honey. The honey blend was boiled for ten minutes in order to test whether enzymes in the honey were the cause of clarification. The act of boiling the honey should have destroyed any enzymes present. As the results of Table I show, the boiled honey blend clarified the apple juice and in fact caused heavy precipitation and sedimentation within an hour thus demonstrating that enzymes are not responsible for the ability of the honey to clarify.

cider produced 0.8 cm of sedimentation while amounts ranging from two to fifteen weight percent clarified the 25 ml. samples of hard apple cider.

TABLE II

| Wt. % of Honey in 25ml. of Hard Apple Cider | gm. Honey Added | ml. 50% Honey Solution Added | °BRIX | One Hour and Thirty-Five Minutes After Mixing | Approx. Four Hours After Mixing | Approx. 19 Hours After Mixing |
|---|---|---|---|---|---|---|
| 0 | 0 | 0 | 12.6 | | No Clarification | Very slight trace of sediment on edge of bottom- No clarification. |
| ½ | .12 | .25 | 13.0 | | No Clarification | |
| 1 | .25 | .50 | 13.3 | | No Clarification | 0.8 cm. sediment, much haze and suspended particles |
| 2 | .50 | 1.0 | | | Clarifying | 1.2 cm. sediment, sparkling small amount of suspended particles |
| 3 | .75 | 1.5 | | | Clarifying | 1.5 cm. sediment, sparkling, small amount of suspended particles |
| 4 | 1.00 | 2.0 | | | Clarifying | 1.6 cm. sediment, sparkling, small amount of suspended particles |
| 5 | 1.25 | 2.5 | 15.3 | Very noticeable clearing | Clarifying | |
| 10 | 2.50 | 5.0 | 17.8 | Very noticeable clearing | Clarifying | 2.2 cm. sediment, sparkling, small amount of suspended particles |
| 15 | 3.80 | 7.6 | 19.6 | Very noticeable clearing | Clarifying | 2.4 cm. sediment, sparkling small amount of suspended particles |

EXAMPLE III

Different samples of grape juice, grapefruit juice, and orange juice produced as reconstituted concentrates, and red and white wines were each separately treated with one of the following:
(a) four percent of honey;
(b) four percent of honey plus 0.04% of tannic acid solution; and
(c) four percent of honey plus 0.08% of a solution of tannic acid.

TABLE I

| | | PRECIPTATION OBSERVATION | | | | | | | | | | | |
|---|---|---|---|---|---|---|---|---|---|---|---|---|---|
| | | ONE HOUR AFTER MIXING | | TWO HOURS AFTER MIXING | | | 5½ HOURS AFTER MIXING | | | | 21 HOURS AFTER MIXING | | |
| Honey | Wt.% | Precipitation | Sediment Amt. (cm) | Precipitation | Sediment Amt. (cm) | Haze | Precipitation | Sediment Amt. (cm) | Haze | Sparkle | Precipitation | Sediment Amt. (cm) | Haze | Sparkle |
| SUNFLOWER | 1 | N | | N | | | N | | S | | N | | | |
| | 2 | N | | VS | | | | 1.0 | SM | | | 1.0 | M | |
| | 3 | SM | | | 1.6 | M | | 1.3 | SM | Yes | | 1.2 | S | |
| BUCKWHEAT | 1 | VVS | | S | | | | 1.2 | SM | Yes | | 1.0 | SM | |
| | 2 | M | | | 2.1 | SM | | 1.5 | SM | Yes | | 1.2 | S | |
| | 3 | M | | | 2.4 | SM | | 1.7 | SM | Yes | | 1.4 | S | |
| CLOVER | 1 | N | | N | | | N | | | | N | | | |
| | 2 | N | | S | | | | 1.2 | M | Yes | | 1.2 | SM | |
| | 3 | S | | | 1.6 | SM | | 1.4 | SM | Yes | | 1.3 | S | |
| BLEND | 1 | N | | VS | | | | 1.2 | M | Yes | | 1.1 | M | |
| | 2 | M | | | 2.1 | S | | 1.8 | S | Yes | | 1.3 | S | |
| | 3 | H | | | 2.6 | S | | 2.1 | S | Yes | | 1.5 | S | |
| BOILED BLEND | 2 | H | 2.5 | | 1.6 | M | | | | Yes | | 1.3 | M | |
| KLERZYME | .02 | S | | | 1.3 | S | | 1.0 | S | Yes | | 1.0 | S | Yes |

EXAMPLE II

Eight 25 ml. hard apple cider samples were treated with honey ranging in amounts from one-half to 15 weight percent. The honey additive was prepared as a 50/50 percent by volume mixture of honey and water. The honey additive was mixed with the apple cider and agitated and allowed to stand for observation. The results of this clarification treatment are shown in Table II. The clarification process was performed at 75° F.

As demonstrated by the results of Table II, one weight percent of honey added to unclarified apple All of the tested fruit juices showed moderate coagulation with treatment (a), (b) or (c) within twenty-four (24) minutes. The grape juice samples were totally sparkling and settled within fifty (50) minutes.

The red wine which was treated with (a) was clarified and sparkling after five hours while two samples of the red wine treated with (c) clarified in one hour and in three hours respectively.

The white wine tested did not clarify in (a) when no tannin was added, however, the treatment with (b) clarified in 130 minutes and with (c) clarified in one hour.

EXAMPLE IV

Two 100 ml. samples of fermented pear juice containing 193 and 21 mg. of tannin respectively were treated with four percent by weight of honey. After one and one-half hours the high tannin content pear cider was completely settled out and sparkling, however, the low tannin content pear cider was not coagulated after thirty hours.

When four percent of honey and 0.08% of tannin solution was added to a low tannin content, very hazy pear cider, the cider was clarified and sparkling in twenty minutes.

EXAMPLE V

Freshly pressed apple cider was contained for three weeks at 32° F. Separate samples of cider were treated at 68° F. with (a) 4% by weight of honey, (b) 4% of honey and 0.04% of a tannic acid, (c) 0.025% of Klerzyme (a commercially used clarifying enzyme), (d) 0.025% of Klerzyme and 4% of honey, (e) 0.025% of Klerzyme, 4% of honey and 0.04% of a tannic acid solution.

The apple cider sample treated with (a), honey alone, was clarified and sparkling after approximately six hours. The apple cider sample treated with (b), honey plus tannin, showed moderate coagulation after eight hours, however, it never completely clarified having a slight haze as the tannic content was too high.

The apple cider sample treated with (c), Klerzyme only, showed only slight signs of coagulation after 18 hours. The amount of Klerzyme was doubled to 0.05% by weight and the cider did not clarify.

The apple cider sample treated with (d), a combination of honey and Klerzyme showed sparkling areas after forty minutes and was completely clarified and sparkling after ninety minutes.

The apple cider sample treated with (e), Klerzyme, honey, and tannin, was totally settled after 2½ hours but retained a slight haze attributed to excess tannin. EXAMPLE VI Non-pasteurized and pasteurized, unclarified apple juice samples were treated with a combination of 4% by weight of honey and 0.04% by weight of tannic acid solution. After eight hours both the pasteurized and non-pasteurized apple juice samples were clarified and sparkling. The pasteurized apple juice clarified at a slower rate.

EXAMPLE VII

Hard apple cider was treated with Bentonite, a commercial clarifier, but was not clarified. The cider was divided into four samples into which 4% by weight of honey was added to each sample and either 0%, 0.01% or 0.08% of tannic acid solution was added. After twenty-four hours the sample having no added tannin had a slight haze but all remaining samples were sparkling clear.

EXAMPLE VIII

Hard apple cider was treated with Sparkolloid, a commercial clarifier, but was unclarified. The cider was divided into three samples. All samples were mixed with 4% by weight of honey and either 0%, 0.01% or 0.08% of tannic acid solution. The cider samples treated with both honey and tannic acid were clarified and sparkling after 1½ hours and the cider sample treated with honey alone was clarified and was sparkling after four hours.

EXAMPLE IX

The precipitates (5 ml.) from two 25 ml. samples of Red Delicious and MacIntosh apple cider, formed from honey clarification, were separately added to two 25 ml. samples of the same unclarified cider. Coagulation and settling occurred in three hours to produce clarified cider samples.

EXAMPLE X

This example demonstrates the most effective tannin addition period in the honey clarification method.

Four 25 ml. samples of fresh apple cider were treated with four percent of honey. Additionally three of the samples were treated with a 0.02% of a tannic acid solution in a manner such that in one sample the tannin was added five minutes prior to the addition of the honey, in the second sample the honey and tannin were added conjointly, and in the third sample the tannin was added five minutes after the addition of the honey. The coagulation rates of these four samples appear in Table III.

TABLE III

| SAMPLE | 4% Honey | 4% Honey and 0.02% Tannin Added 5 Minutes Before Heavy Honey Addition | 4% Honey and 0.02% Tannin Added Con-jointly | 4% Honey and 0.02% Tannin Added 5 Minutes After Honey Addition |
|---|---|---|---|---|
| Minutes To: (after all additions) | | | | |
| Initial Coagulation | 30 | 15 | 20 | 23 |
| Moderate Coagulation | 60 | 30 | 33 | 40 |
| Heavy Setting | 110 | 50 | 65 | 85 |

As is demonstrated by the results in Table III, tannin effectively promotes heavy settling even when added after the addition of honey, however, the clarification proceeds at a slower rate. Thus tannin can be added at any stage of clarification.

I claim:

1. A process for treating fresh, pasteurized, or fermented unclarified or preclarified fruit juice to clarify it and to render it stable to haze formation by mixing the juice with honey in an amount sufficient to clarify the juice and agitating the mixture for a time sufficient to clarify the juice thereby forming a clarified juice and a precipitate and separating the clarified juice from the precipitate mixing the juice with honey and a clarifying enzyme in a total amount sufficient to clarify the juice and agitating the mixture for a time sufficient to clarify the juice thereby forming a clarified juice and a precipitate and separating the clarified juice from the precipitate.

2. The process of claim 1 wherein the amount of honey used to clarify the juice is one half to ten weight percent of the juice.

3. The process of claim 1 wherein the amount of honey used to clarify the juice is from two to five weight percent of the juice.

4. The process of claim 1 wherein the fresh fruit juice is apple juice.

5. The process of claim 1 wherein the fresh fruit juice is grape juice.

6. The process of claim 1 wherein the fresh fruit juice is pear juice.

7. The process of claim 1 wherein the fermented fruit juice is apple cider.

8. The process of claim 1 wherein the fermented fruit juice is wine.

9. The process of claim 1 wherein the fruit juice is used in the production of fruit jelly.

10. The process of claim 1 wherein the fresh, pasteurized, or fermented unclarified juice is pre-clarified using a clarification treatment with bentonite, sparkolloid, gelatin or an enzyme clarifying agent.

11. The process of claim 1, wherein the honey used for clarification is a recovered precipitate from a previous clarification process.

12. A process for treating fresh, pasteurized, or fermented unclarified or preclarified fruit juice to clarify it and to render it stable to haze formation by mixing the juice with honey and a clarifying enzyme in a total amount sufficient to clarify the juice and agitating the mixture for a time sufficient to clarify the juice thereby forming a clarified juice and a precipitate and separating the clarified juice from the precipitate.

13. The process of claim 12 wherein the amount of honey used to clarify the juice is from one-half to ten weight percent and the amount of clarifying enzyme is at least 0.002 weight percent per weight of the juice.

14. The process of claim 12 wherein the fresh fruit juice is apple juice.

15. The process of claim 12 wherein the fresh fruit juice is pear juice.

16. The process of claim 12 wherein the fresh fruit juice is grape juice.

17. The process of claim 12 wherein the fermented fruit juice is apple cider.

18. The process of claim 12 wherein the fermented fruit juice is wine.

19. The process of claim 12, wherein the fresh, pasteurized, or fermented unclarified juice is pre-clarified using a clarification treatment with bentonite, sparkolloid, gelatin, or an enzyme clarifying agent.

20. The process of claim 12, wherein the honey used for clarification is a recovered precipitate from a previous clarification process.

21. The process of claim 12 wherein the fruit juice is used in the production of fruit jelly.

22. A process for treating fresh, pasteurized, or fermented unclarified or preclarified fruit juice to clarify it and to render it stable to haze formation by mixing the juice with 0.01 to 0.5 weight percent of a tannin or an effective tannin derivative and with honey in an amount sufficient to clarify the juice and agitating the mixture for a time sufficient to clarify the juice thereby forming a clarified juice and a precipitate and separating the clarified juice from the precipitate.

23. The process of claim 22 wherein the amount of honey used to clarify the juice is from one-half to ten weight percent of the weight of the juice.

24. The process of claim 22 wherein the amount of honey used to clarify the juice is from two to five weight percent of the weight of the juice.

25. The process of claim 22 wherein the fresh fruit juice is apple juice.

26. The process of claim 22 wherein the fresh fruit juice is pear juice.

27. The process of claim 22 wherein the fresh fruit juice is grape juice.

28. The process of claim 22 wherein the fermented fruit juice is apple cider.

29. The process of claim 22 wherein the fermented fruit juice is wine.

30. The process of claim 22, wherein the fresh, pasteurized or fermented unclarified juice is pre-clarified using a clarification treatment with bentonite, sparkolloid, gelatin, or an enzyme clarifying agent.

31. The process of claim 22, wherein the honey used for clarification is a recovered precipitate from a previous clarification process.

32. The process of claim 22 wherein the juice is contacted with tannin prior to its contact with honey.

33. The process of claim 22 wherein the fruit juice is used in the production of fruit jelly.

* * * * *

UNITED STATES PATENT AND TRADEMARK OFFICE
CERTIFICATE OF CORRECTION

PATENT NO. : 4,327,115
DATED : April 27, 1982
INVENTOR(S) : Robert W. Kime

It is certified that error appears in the above-identified patent and that said Letters Patent are hereby corrected as shown below:

Claim 1 should read as follows:

--1. A process for treating fresh, pasteurized, or fermented unclarified or preclarified fruit juice to clarify it and to render it stable to haze formation by mixing the juice with honey in an amount sufficient to clarify the juice and agitating the mixture for a time sufficient to clarify the juice thereby forming a clarified juice and a precipitate and separating the clarified juice from the precipitate.--

Signed and Sealed this

Twenty-ninth Day of May 1984

[SEAL]

Attest:

GERALD J. MOSSINGHOFF

Attesting Officer

Commissioner of Patents and Trademarks